United States Patent [19]

Berkey et al.

[11] Patent Number: 4,932,740
[45] Date of Patent: Jun. 12, 1990

[54] METHOD OF MAKING POLARIZATION RETAINING OPTICAL FIBER COUPLER

[75] Inventors: George E. Berkey, Pine City; Robert M. Hawk, Bath, both of N.Y.

[73] Assignee: Corning Incorporated, Corning, N.Y.

[21] Appl. No.: 361,383

[22] Filed: Jun. 5, 1989

[51] Int. Cl.$^5$ .............................................. G02B 6/26
[52] U.S. Cl. .................................. 350/96.15; 65/3.11; 350/96.33
[58] Field of Search .............................. 65/3.11, 3.12; 350/96.15, 96.16, 96.29, 96.30, 96.33, 96.34

[56] References Cited

U.S. PATENT DOCUMENTS

| | | | |
|---|---|---|---|
| 4,688,882 | 8/1987 | Failes | 350/96.15 |
| 4,753,497 | 6/1988 | Fujii et al. | 350/96.15 |
| 4,755,021 | 7/1988 | Dyott | 350/96.30 |
| 4,756,589 | 7/1988 | Bricheno et al. | 350/96.15 |
| 4,779,945 | 10/1988 | Hill et al. | 350/96.15 |

Primary Examiner—John D. Lee
Attorney, Agent, or Firm—William J. Simmons, Jr.

[57] ABSTRACT

A method of making a polarization retaining single-mode (PRSM) optical fiber coupler. A section of coating is stripped from the central portion of two PRSM optical fibers. The fibers extend through the bore of a glass tube, the stripped portions being centered in the tube, and the coating portions extending into the ends of the bore. In one embodiment, each fiber is provided with a rectangularly shaped coating, and the two larger flattened sides of the coating are specifically oriented with respect to the major and minor axes of the PRSM fiber therein. The fiber coating can be disposed in only one orientation in the rectangularly-shaped tube bore, thereby properly orienting the two PRSM fibers with respect to each other. In another embodiment, the PRSM fibers are disposed within a single coating, the azimuthal inhomogeny of one fiber being aligned in the coating with respect to that of the remaining fibers. In both embodiments, the fiber coating material is utilized to facilitate the alignment of the major axes of the fibers. The fibers are held taut, and the tube midregion is heated, collapsed about the fibers, and drawn to reduce the diameter thereof.

24 Claims, 4 Drawing Sheets

METHOD OF MAKING POLARIZATION RETAINING OPTICAL FIBER COUPLER

CROSS-REFERENCE TO RELATED APPLICATION

This patent application is related to our copending U.S. Patent Application Ser. No. 07/361,385 entitled "Method of Coating Optical Fibers" (Berkey et al. 15-7) filed on even date herewith.

BACKGROUND OF THE INVENTION

The present invention relates generally to the field of polarization retaining optical fiber couplers and more particularly to a method of making such couplers wherein proper alignment of the fibers is facilitated.

It has been known that coupling occurs between two closely spaced cores in a multiple core device. The coupling efficiency increases with decreasing core separation and, in the case of single-mode cores, with decreasing core diameter. Fiber optic couplers employed in systems such as fiber optic gyroscopes must be capable of preserving the polarization of optical signals propagated therethrough. Such couplers are preferably made from single-mode fibers which are capable of preserving the polarization of signals along two different, usually orthogonal axes. Polarization retaining single-mode (PRSM) fiber optic couplers are disclosed in U.S. Pat. Nos. 4,589,725 and 4,755,021 issued to R. B. Dyott and U.S. Pat. No. 4,753,497 issued to Y. Fujii et al. The couplers taught in those patents comprise PRSM fibers of the type wherein the core is surrounded by an elliptically-shaped cladding layer which imparts a stress to the core.

U.S. Pat. No. 4,755,021 teaches a coupler comprising PRSM fibers having two intersecting flat surfaces. Two or more of these fibers are etched along those portions of their lengths where it is desired to couple the fields of the fibers. The etched fibers are fed, with their flat sides facing each other, through a glass tube which is heated until the central region thereof collapses onto the fibers. The etching and the subsequent handling of the etched fibers is a tedious process. Moreover, the cross-sectional shape of these fibers makes it difficult to connect them to conventional single-mode fibers having axial cores.

In U.S. Pat. No. 4,753,497 a circular PRSM fiber is bonded in a channel with the major axis of the elliptical cladding either perpendicular to or parallel to the channel surface. The substrate in which the channel is located and the PRSM fiber embedded therein are then abraided away to a depth sufficient to permit light propagating in the core to escape from the fiber. To form a coupler, two similarly formed substrates are combined with index matching fluid interposed therebetween. Connection of the coupler fibers to the other system fibers is facilitated by the use of circular PRSM fibers. However, to ensure proper functioning of such a coupler, the technician forming the coupler must know the orientation of the major axes of the PRSM fibers so that they can be positioned in suitable alignment. It is sometimes extremely difficult to determine the relative orientation of a circular PRSM fiber from a transverse observation thereof.

SUMMARY OF THE INVENTION

It is therefore an object of the present invention to provide a method that overcomes the disadvantages of the prior art. Another object is to provide a method of facilitating the orientation of polarization retaining single-mode optical fibers during the fabrication of an optical coupler therefrom. A further object is to provide an inexpensive method of making polarization retaining single-mode optical fiber couplers.

One aspect of the present invention relates to a method of making fiber optic couplers comprising PRSM optical fibers. In such couplers, each fiber has an azimuthal inhomogeneity that must be aligned with the azimuthal inhomogeneity of each remaining fiber. The coupler may be of the type wherein two or more optical fibers are fused together such that there is a common cladding region in which all cores are disposed. The coupling region of this type of coupler is characterized in that the cores are closer together and the core diameters are smaller in that region than in the remainder of the fibers. This relationship between the cores enables the coupling of optical energy between the fibers. The coupler is optionally formed with a glass tube that is fused to the fibers in the coupling region.

At least two sections of polarization retaining optical fiber are disposed in side-by-side relationship, each fiber possessing an azimuthal inhomogeneity. The azimuthal inhomogeneity of each fiber is oriented with respect to that of each remaining fiber. At least a portion of the fibers adjacent the fiber sections have a coating. At least the midregions of the fiber sections are heated and stretched to join the fibers in side-by-side fashion and to elongate the fibers, whereby the cores thereof are reduced in diameter and are brought closer together. The method is characterized in that the fiber coating is utilized to facilitate the azimuthal orientation of the fibers.

In one embodiment, each portion of optical fiber has a coating which has an azimuthal inhomogeneity that is oriented with respect to the azimuthal inhomogeneity of the fiber therein. The azimuthal inhomogeneity of each coating is aligned with respect to the azimuthal inhomogeneity of each of the remaining coatings to align the azimuthal inhomogeneities of the fibers. The step of disposing may comprise disposing the ends of the fiber portions in the end of the bore of a glass tube, the fiber sections extending through the remainder of the bore which has at least one flat wall surface. Each portion of optical fiber may have a coating which has at least one substantially flat surface. Each flat surface of a coating is situated adjacent a flat wall surface of the bore. The flat surfaces of at least two coatings could be disposed adjacent the same flat wall surface. The tube midregion is heated to collapse it onto the fibers, and at least a portion of the tube midregion is stretched or drawn.

Alternatively, all of the portions of optical fiber could be disposed in a common coating, the surface of which could be round or flattened. The azimuthal inhomogeneities of the fibers are properly aligned within the common coating. If a tube is employed with this embodiment, the bore of the tube could be round, or it could be provided with flat wall surfaces. In the latter case, the common coating could be provided with opposed flat surfaces which are situated adjacent the flat wall surfaces of the bore.

The resultant optical fiber coupler comprises at least two polarization retaining glass glass optical fibers, each having an azimuthal inhomogeneity. A section of each fiber is free from coating material. The portions of each fiber on either end of the section has coating means for orienting the azimuthal inhomogeneities of the fibers, the coating means being asymmetrical with respect to the axes of the fibers. The midregions of the fiber sections are fused in side-by-side relation to form a fused cladding in which the cores of the fibers are disposed. The midregion of the fused cladding has a central portion. The diameters of the cores of the fibers are smaller in the central portion than in the remainder of the midregion, and the cores of the fibers are more closely spaced in the central portion than in the remainder of the midregion.

In one embodiment, the coating means is characterized such that each fiber is provided with a coating having at least one flat surface, the flat surfaces of adjacent coatings being congruently disposed. Alternatively, the coating means may be characterized such that all of the fibers are disposed within a common coating and the azimuthal orientations of the fibers are properly aligned in the coating.

If a tube is employed in the coupler fabrication process, the coupler may comprise an elongated glass body having a solid midregion and first and second opposite end portions which respectively extend from the midregion to the first and second ends of the body. The central portion of the midregion has a smaller diameter than the remainder thereof. First and second longitudinal bores respectively extend from the first and second ends of the body to the midregion thereof. At least two polarization retaining glass glass optical fibers extend through the body and beyond the first and second ends thereof. Each fiber has a core and a cladding and has an azimuthal inhomogeneity. The diameters of the cores of the fibers are smaller in the central portion than in the remainder of the midregion, and the cores of the fibers are more closely spaced in the central portion than in the remainder of the midregion. The fiber claddings are fused together in the central portion to form a unitary mass. The fibers are provided with coating means for orienting the azimuthal inhomogeneities of the fibers. The coating means is disposed on those portions of the fibers that extend from the body and on those portions of the fibers extending into the ends of the bores at the first and second ends of the body. Those portions of the fibers that are disposed in the midregion have no coating. The coupler may comprise means within the bores for attaching the fibers to the ends of the glass body.

The coating means may be characterized such that each fiber is provided with a coating having at least one flat surface. The longitudinal bores may have flat wall surfaces which are disposed adjacent a flat surface of a coating.

DESCRIPTION OF THE PREFERRED EMBODIMENTS

The drawings are not intended to indicate scale or relative proportions of the elements shown therein.

Figure 1:
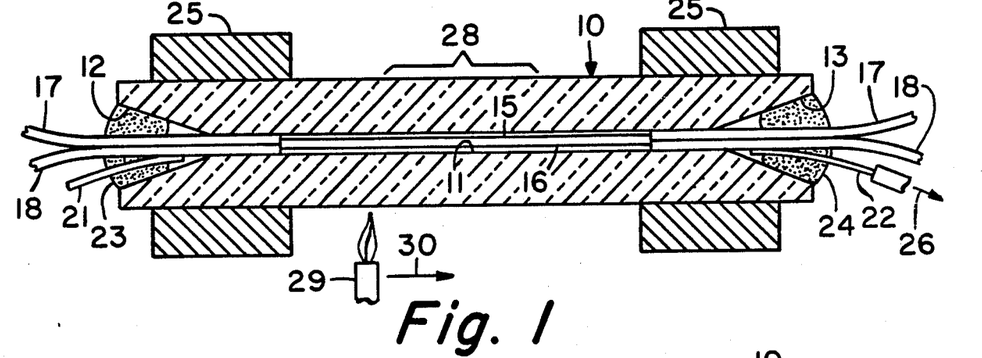
FIG. 1 is a cross-sectional view of a glass tube after prepared optical fibers have been placed therein.
Figure 2:
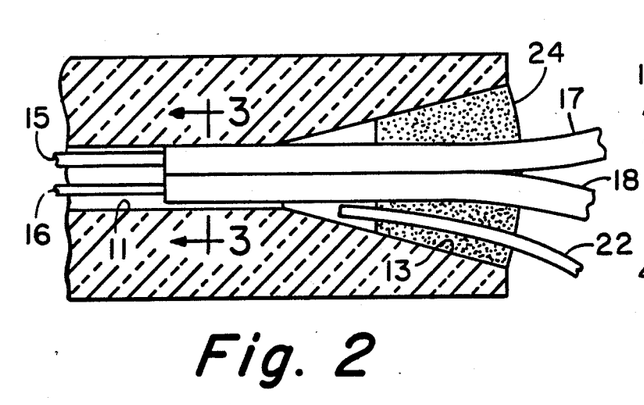
FIG. 2 is an enlarged cross-sectional view of one end of the tube of FIG. 1.
Figure 3:
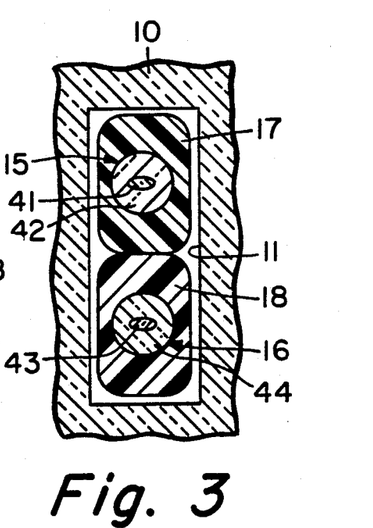
FIG. 3 is a partial cross-sectional view taken along lines 3—3 of FIG. 2.

FIGS. 1, 2 and 3 show a cylindrical glass capillary tube 10 having a longitudinally extending aperture or bore 11. Bore 11 may have a rectangular cross-section as shown in FIG. 3, or its cross-sectional configuration may be square, circular or the like depending upon such factors as the cross-sectional shape of the fiber coating and whether two or more fibers are disposed in a single coating. A method of forming precision shaped bores in glass tubes is taught in U.S. Pat. No. 4,750,926. The bore is initially made larger than the size required for optical couplers; it is then drawn to reduce the bore diameter. Tapered apertures 12 and 13, which form funnel-like entrances to the ends of bore 11, facilitate fiber insertion. Tapered apertures can be formed by methods such as machining, particle bombardment or the like. A particularly suitable method is disclosed in U.S. patent application Ser. No. 082,680 entitled "Capillary Splice and Method" filed Aug. 7, 1987 (Berkey-9) (now U.S. Pat. No. 4,822,389).

The softening point temperature of tube 10 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. A preferred composition is borosilicate glass comprising $SiO_2$ doped with 8–10 wt. % $B_2O_3$. In addition to lowering the softening point temperature of $SiO_2$, $B_2O_3$ and F also advantageously decrease the refractive index thereof.

FIG. 3 shows that fibers 15 and 16, which comprise cores 41 and 43 and cladding layers 42 and 44, respectively, are provided with protective coatings 17 and 18, respectively. A portion of the coating intermediate the ends of each fiber is removed for a distance slightly shorter than the length of bore 11. The exposed fiber sections are wiped to eliminate residual material. Fibers 15 and 16 are fed through bore 11 so that a suitable length of coated fiber extends beyond each end of tube 10 for connection purposes, a length of one meter being suitable. The uncoated sections of the fibers are disposed intermediate the ends of tube 10 and are preferably centered within bore 11. The coated portions of the fibers extend a short distance into the bore to maintain proper fiber orientation. A single line represents each of the fibers 15 and 16 in FIG. 1, an enlarged view of the fibers and tube end being shown in FIG. 2.

To fabricate polarization retaining couplers, the fibers must be kept untwisted and must be maintained parallel to one another, and the major axes of the PRSM fibers must be maintained substantially parallel to one another. It is noted that this orientation includes that orientation wherein the major axes are substantially coaxial. The method of the present invention is characterized in that the fiber coating material is utilized to facilitate the alignment of the major axes of the fibers. In a first described embodiment, each fiber is provided with a rectangularly shaped coating, and the two larger flattened sides of the coating are specifically oriented with respect to the major and minor axes of the PRSM fiber therein. For example, cores 41 and 43 of optical fibers 15 and 16, respectively, of FIG. 3 are elliptically-shaped, and the minor axis of each core is parallel to the long flat sides of the rectangularly-shaped coating. Any reference herein to the shape of the coating or to the major or minor axis of the PRSM fiber means the cross-sectional shape or the orientation of the major or minor axis in a plane perpendicular to the longitudinal axis of the fiber.

When first one coated fiber and then the second is fed through bore 11, they can only become oriented in the manner illustrated in FIG. 3, because of the cross-sectional shapes of the bore and the coatings. As shown in this figure, a flat surface of each coating lies adjacent a flat wall surface of bore 11. The dimensions of the bore are only slightly larger than the combined dimensions of the coatings to facilitate the feeding of the coated fibers through the bore. If the fit were too tight, coating material could smear on the surface of the bore and contaminate the resultant coupler. In the illustrated orientation, the major axes of fibers 15 and 16 are substantially parallel and the minor axes of the fibers are substantially coaxial. U.S. Pat. No. 4,753,497 teaches that the major axis of each PRSM fiber can be up to 20° out of alignment with respect to an orientation plane (the surface of the substrate in which the fiber is disposed). Apparently, such an alignment is sufficient to enable the coupling of polarized signals between the fibers of the coupler. The term "substantial alignment" is therefore used herein to mean that the major axes (and thus also the minor axes) of the PRSM fibers of the coupler are sufficiently aligned to enable the coupling of polarized signals.

Hollow glass filament 21 is inserted into tapered aperture 11, and the hollow filament along with the coated fibers are secured to the end portion of tube 10 by applying a quantity of glue 23 within and about tapered aperture 12. The process is repeated at the other end of tube 10 by inserting a second hollow glass filament 22 into tapered aperture 13 and applying a quantity of glue 24 to the filament and coated fibers within and about aperture 13. The hollow filaments extend into the tapered apertures a distance sufficient to prevent the glue from flowing onto their ends and causing blockage. Glue 23 and 24 may consist of any bonding material such as cement, adhesive or the like, UV curable epoxy being preferred. The fibers are preferably held taut during a subsequently performed tube collapse step; a slight tension is therefore applied to the coated fibers while glue 24 is setting or curing. Since the fibers are held taut, the major axes of the uncoated portions of the PRSM fibers are oriented as shown in FIG. 3 throughout the tube midregion.

The assembly so formed is placed in a suitable mounting device or holder 25, such as a tinners clamp. Hollow filament 22 may then be connected to a source of vacuum (not shown) illustrated by arrow 26. Alternatively, a tube connected to a source of vacuum may be placed around the end of capillary tube 10 so that hollow filament 22 and fibers 15 and 16 extend into the evacuated tube. The assembly comprising tube 10 and the fibers extending therethrough is optionally subjected to a final cleaning step prior to collapsing tube 10 and fusing together the stripped fiber portions. If hollow filament 21 is inserted into a liquid cleaning fluid, the fluid is drawn through longitudinal bore 11 by the vacuum applied to hollow filament 22 whereby it cleans the interior of longitudinal bore 11 and those portions of fibers 15 and 16 and hollow filaments 21 and 22 that are disposed therein. A cleaning fluid comprising a liquid cleaning solution such as a 30% ammonia solution or a gas such as air may be flowed through bore 11. If a liquid cleaning fluid is employed, midregion 28 of the assembly so formed is then heated by a suitable heat source 29 to vaporize the liquid and dry out the assembly. Heat source 29 may comprise an oxygen-hydrogen burner, a gas-oxygen burner, or the like.

Figure 5:
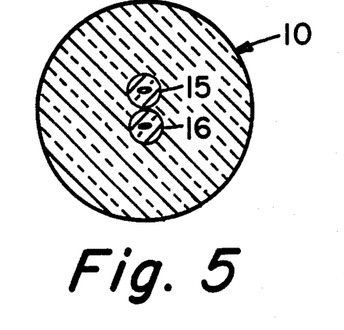
FIG. 5 is a cross-sectional view through the solid midregion of FIG. 4 along lines 5—5.

In one embodiment, tube 10 is heated and collapsed onto fibers 15 and 16 in a step that is separate from the step of stretching the midregion of tube 10. As shown in FIG. 1, the flame from burner 29 is directed onto midregion 28 to heat glass tube 10 to its softening point. Burner 29 may remain stationary, or it may traverse midregion 28 in the direction toward vacuum source 26 as shown by arrow 30. It is an optional feature of the tube collapse step to apply a vacuum source to both hollow filaments 21 and 22, in which case the direction of burner traverse is immaterial. Midregion 28 becomes a solid region that is preferably free of air lines, bubbles, or the like. Since the fiber coatings are oriented within bore 11 as shown in FIG. 3 and the fibers are held taut during the collapse step, the major axes of the PRSM fibers are substantially parallel in the collapsed midregion as shown in FIG. 5.

Figure 4:
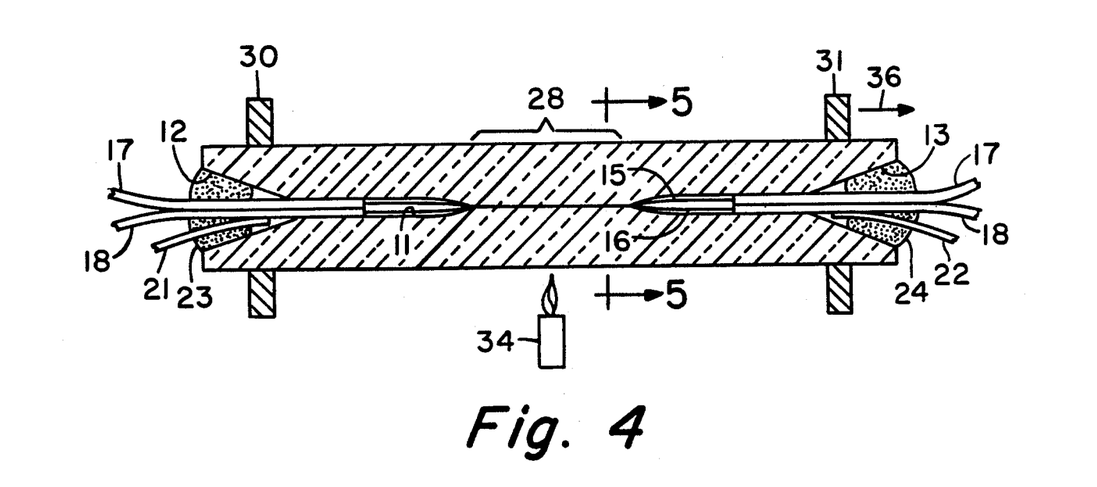
FIG. 4 is a cross-sectional view illustrating the collapse of the glass tube around the fibers to form a solid midregion.
Figure 6:
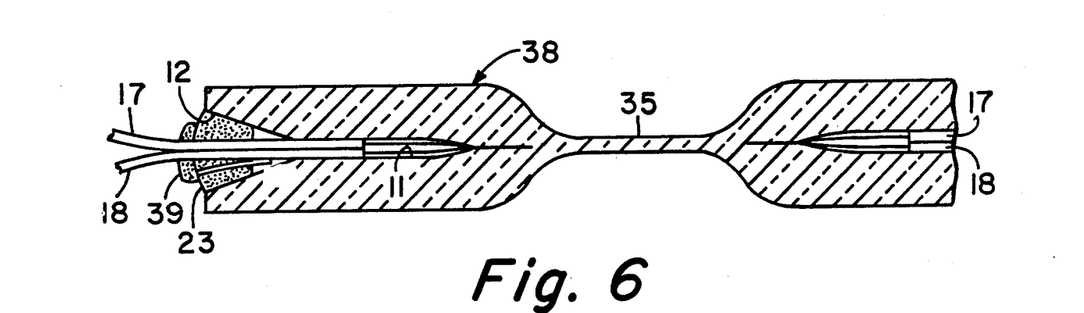
FIG. 6 is a cross-sectional illustration of the fiber coupler of the present invention after it has been drawn down and sealed at its ends.

After midregion 28 is collapsed onto the fibers in the apparatus of FIG. 1, the assembly so formed is removed from holder 25 and placed in precision glass working lathe 30, 31 (FIG. 4). The solid midregion 28 is then subjected to the flame from burner 34 until the central portion of the midregion is heated to the softening point thereof. The flame is removed, and the softened portion of midregion 28 is pulled or drawn down by action of the glass working lathe to reduce the diameter thereof as illustrated by region 35 of FIG. 6, wherein the spacing between the fiber cores is sufficiently small to accomplish a predetermined type of coupling. In the illustrated embodiment, lathe member 30 is held stationary while lathe member 31 is traversed in the direction of arrow 36. Drawn down region 35 is obtained when tube 10 is stretched by the indicated movement of lathe member 31. In practice, such a pull down or draw down takes approximately ½ second. Alternative drawing techniques involve the movement of lathe members 30 and 31 in the same direction at different speeds or movement of members 30 and 31 in different directions.

The diameter of drawn down region 35 will vary as a function of various fiber and operational parameters. The ratio of the drawn down diameter of region 35 to the starting diameter of midregion 28 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about ½ to 1/20; however, couplers can be made having draw down ratios outside this range.

If the entire midregion were stretched, the end portions of the light coupling region of the fibers could be exposed to the adjacent portion of the open bore. Stretching only the central portion of the collapsed midregion ensures that the coupling region of the fibers will be embedded in the matrix glass of the capillary tube.

The assembly would not need to be rotated if the draw down portion of midregion 28 were heated by a ring burner which would uniformly heat that region around its periphery. The draw down method would otherwise be the same. In the embodiment wherein a ring burner is employed, the step of collapsing tube 10 onto fibers 15 and 16 and the step of forming drawn down region 35 may be performed on the same apparatus. If the collapse and stretch operations are performed in the same apparatus, it is preferred that tube 10 be allowed to cool prior to being reheated for the stretch step. This temporal separation of the two steps results in better process control and therefore better reproducibility. Furthermore, tube 10 can be disposed in any orientation including vertical and horizontal during the tube collapse and/or drawing operations.

After the draw down step has been performed, the exposed ends of hollow filaments 21 and 22 are removed by breaking them off at the surface of glue 23 and 24, and the open ends thereof are sealed with quantities 39 of glue. The resultant fiber optic coupler 38 (FIG. 6) functions to couple a polarized single-mode signal in optical fiber 15 to optical fiber 16 and vice versa.

In accordance with the above-described embodiment, the steps of collapsing and stretching are separately performed. Low loss couplers can also been made by an alternative embodiment wherein the steps of collapsing the tube onto the fibers and stretching the midregion are performed in a single heating operation. This alternative embodiment is disclosed in U.S. patent application Ser. No. 204,620 entitled "Method of Making an Economical Fiber Coupler" filed June 9, 1988 (Berkey 11A), which is incorporated herein by reference. The disadvantages of this embodiment are a reduction in hermeticity and an adverse affect on manufacturing reproducibility, i.e. stretching to a predetermined length does not always result in the desired coupling characteristics.

In another alternative embodiment a hollow fiber is employed in only one end of tube 10. Such an embodiment is similar to that resulting in the formation of coupler 38 except that the internal cleansing step described will not be practical.

Aforementioned U.S. patent application Ser. No. 204,620 teaches a coupler forming method wherein the hollow fibers are eliminated entirely. Instead of surrounding fiber coatings 17 and 18 with glue, as described in conjunction with FIG. 1, a small amount of glue is applied to one side of the fiber coatings to attach them to one side of tapered aperture 12 while leaving an opening which permits access to bore 11 between the glue and the remainder of the tapered aperture 12. Another drop of glue is similarly applied between the fiber coatings and tapered aperture 13. Bore 11 can be evacuated by affixing a vacuum supply tube to one or both ends of capillary tube 10.

For a coupler manufacturing process to consistently produce couplers having predetermined optical characteristics, all of the process steps, including the step of inserting the fibers into the capillary tube should be uniformly performed on each coupler made. Disclosed in the aforementioned the aforementioned U.S. patent application Ser. No. 204,620 is a fiber insertion method which enhances process uniformity. That method employs a fiber insertion station which meets the following criterion. The mechanism which holds the fibers is aligned to facilitate the maintaining of the fibers in an untwisted and straight condition. Means is provided for holding the fibers under a slight tension during the gluing step to eliminate the occurrence of fiber slack or sag during further processing steps. That patent application also discloses an improved apparatus for performing the tube collapsing and stretching steps. The chucks are mounted on motor controlled stages, which are preferably controlled by a computer. Coupler bidirectionality is enhanced by locating the burner centrally along the coupler preform so that it heats the preform evenly.

Figure 7:
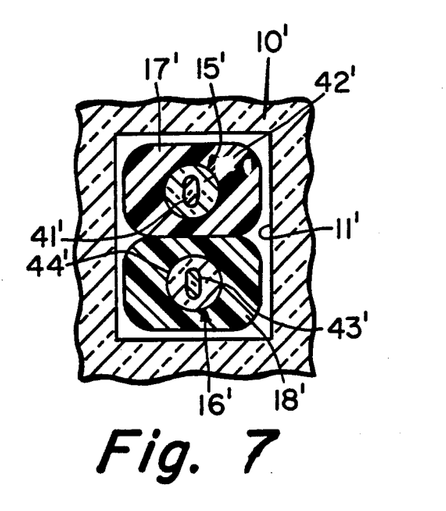
FIG. 7 is a partial cross-sectional view showing a modified arrangement of coated fibers in a bore.

The long sides of the rectangularly-shaped coatings of the two fibers could be in mutual contact as shown in FIG. 7 wherein elements similar to those of FIG. 3 are represented by primed reference numerals. This embodiment illustrates that the major axes of the two PRSM fibers may be substantially coaxial, if desired. This embodiment is less suitable than that of FIG. 3 since the first coated fiber to be fed through bore 11' might not initially lay flat in the illustrated position. That is, if coating 18' were oriented 90° with respect to the illustrated position, coating 17' would not fit in the bore. Thus, this embodiment requires more care in feeding the fibers into the bore. One solution to this problem is to place a very small amount of glue on the flat coating surface near one end of a coated fiber. The two coated fibers are then held together as shown in FIG. 7 with the glue therebetween. After the glue has cured, the two coated fibers are fed together through bore 11'. The step of feeding the coated fibers into bore 11' could be facilitated by employing a square bore, in which case the combined cross-sectional shape of coatings 17' and 18' would preferably be square.

Figure 8:
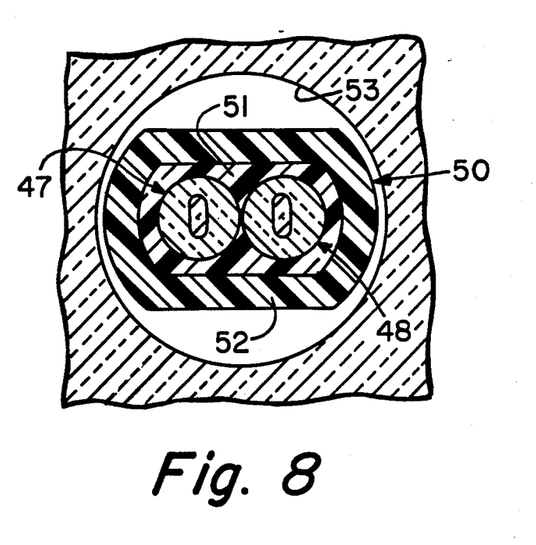
FIG. 8 is a partial cross-sectional view of an embodiment wherein two fibers are maintained in proper orientation by a single coating.

The embodiment of FIG. 8 employs a cable 50 comprising PRSM fibers 47 and 48 which are provided with common coatings 51 and 52. Since the fibers are maintained in proper orientation by the coating, the cross-sectional shape of the tube bore is not as important in this embodiment. Circular bore 53, for example, could be employed. Also, the coating could have a different cross-sectional shape such as circular. The steps of fiber insertion and gluing to the tube ends would be similar to those described above. A mechanical stripper sometimes failed to remove all of the coating material from the region between fibers. A solvent stripping technique is preferred.

To connect system fibers to the coupler fibers, a section of coating is stripped from the end of the multi-fiber cable extending from the coupler. After each coupler fiber is joined to its respective system fiber, the individual lengths of fiber are recoated.

Figure 9:
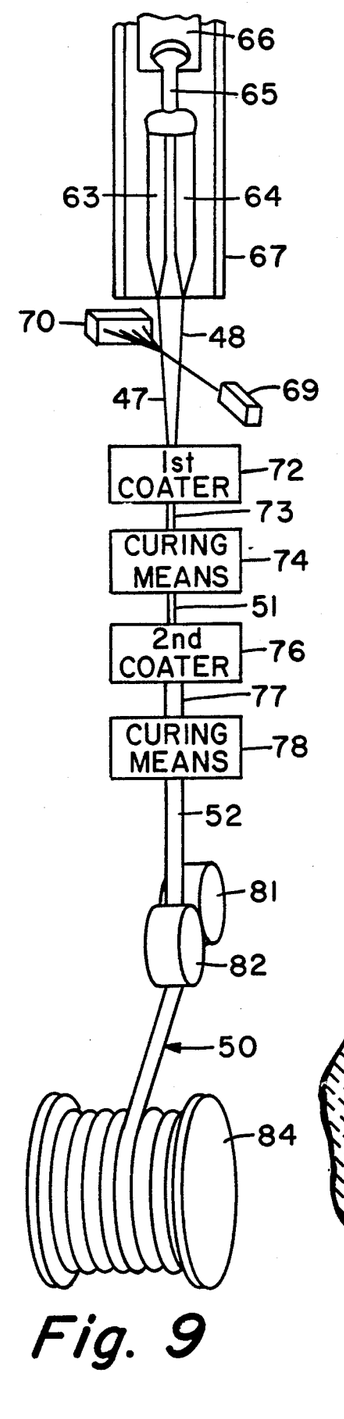
FIG. 9 is a schematic illustration of an apparatus for drawing and coating the cable of FIG. 8.

Cable 50 of FIG. 8 can be drawn by employing the apparatus shown in FIG. 9, which is disclosed in the aforementioned related U.S. patent application Ser. No. 07/361,385 (Berkey et al. 15–7). Optical fibers 47 and 48 are pulled by tractors 81 and 82 from preforms 63 and 64, respectively, the tips of which are softened in furnace 67. Tractors 81, 82 can be belts, pulleys, wheels or combinations thereof. The belt-capstan wheel apparatus disclosed in U.S. Pat. No. 4,755,021 has been found to be satisfactory. Preforms 63 and 64 are fused to a common handle 65 which can be easily mounted in a vertically movable support mechanism 66. Fibers 47 and 48 are drawn through a first coater 72 where a primary coating 73 is applied thereto. After the primary coating is cured by passing it through ultraviolet light curing means 74, the coated fiber is drawn through second coater 76 to apply over cured coating 51 a second coating 77 which is cured in ultraviolet light curing means 78 to form outer coating 52. After passing through tractors 81 and 82, the resultant flexible cable 50 is wound upon reel 84. Fiber diameter may be measured by any suitable means 69, 70.

Figure 10:
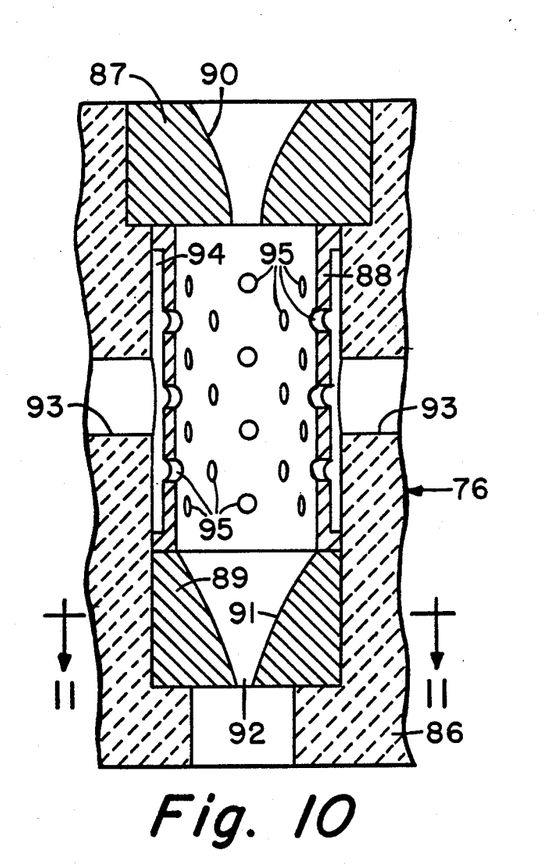
FIG. 10 is a cross-sectional view of a coater used in the apparatus of FIG. 9.
Figure 11:
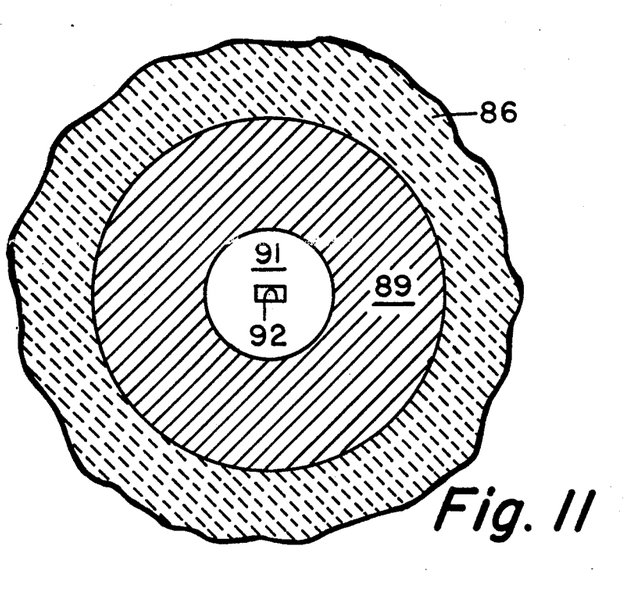
FIG. 11 is an enlarged cross-sectional view taken along lines 11—11 of FIG. 10.

Coater 76, which is shown in greater detail in FIG. 10, is of the general type disclosed in U.S. Pat. No. 4,531,959. Situated in a vertically disposed bore in housing 86 are guide die 87 having tapered aperture 90, flow distribution sleeve 88 and sizing die 89. Tapered aperture 91 extends to the bottom of sizing die 89 to define a sizing orifice 92 which determines the size and shape of the applied coating. As shown in FIG. 11 orifice 92 is rectangularly shaped. Coating material flows through bores 93 into chamber 94 where it surrounds distribution sleeve 88, flows through feed holes 95 and onto the fiber being drawn through the coater.

The first coater sizing orifice need not be rectangularly shaped; it could be a conventional circularly shaped orifice, provided that the final coating is sufficiently flat to prevent cable 50 from twisting in the tractors. A flat coating could also be applied by employing a single coater or more than two coaters, depending upon the desired number of coatings. When urethane acrylate coating material is employed, it is conventional practice to apply two coatings, the second of which has a higher modulus than the first.

Flattened coatings 51 and 52 are produced when coaters 72 and 76 have rectangularly-shaped sizing dies. As the coated fiber moves from the coater to the curing means, the uncured coating begins to flow, thereby changing the cross-sectional shape thereof from a rectangular shape to on having rounded corners as shown in FIG. 8. When conventional urethane acrylate coatings are drawn at at a sufficiently fast rate, they can be cured fast enough to preserve sufficiently flat opposing surfaces to prevent cable 50 from twisting in the tractors. For example, a draw speed of 4 to 5 m/sec is sufficiently fast for a spacing of about 20 cm between the coaters and the ultraviolet light curing means.

Figure 12:
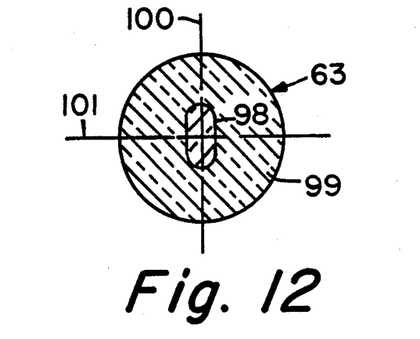
FIG. 12 is a cross-sectional view of one of the optical fiber preforms that may be utilized in the apparatus of FIG. 9.

FIG. 12 is a cross-sectional view of preform 63, preform 64 being similarly shaped. Preform 63 comprises elliptical core region 98 surrounded by cladding region 99, the outer surface of which is circular in cross-section. The refractive index of the core region is greater than that of the cladding region. Preform 63 could be formed by applying cladding glass particles to a core rod having an oblong cross-section, and thereafter consolidating the cladding glass particles. The core glass rod could be formed by any suitable process such as forming a cylinder of core glass, and removing from the cylinder two diametrically opposed longitudinally-extending surface sections by a suitable technique such as sawing, grinding or the like. U.S. Pat. No. 4,578,097 teaches a method of forming a glass rod of oblong cross-section and a method of overcoating such a rod with cladding glass. In PRSM fibers of the type disclosed herein, the orientation of the azimuthal inhomogeneity can be identified by reference to a major axis located in a plane that is transverse to the fiber axis. For example, major axis 100 in the transverse plane of FIG. 12 corresponds to the major axis of elliptical core 98. Minor axis 101 is perpendicular to axis 100 To form PRSM fibers having their major and minor axes oriented as illustrated in FIG. 8, the minor axis 101 of preform 63 is substantially aligned with the minor axis of preform 64 in furnace 67. Fibers 47 and 48 could be drawn with their major axes parallel to the flat surfaces of coating 52 by rotating preforms 63 and 64 90° in the draw furnace.

Whereas only oblong core PRSM fibers are illustrated herein, it is obvious that the method of the present invention is also applicable to other types of PRSM fibers including oblong stress clad fibers, stress rod fibers and the like, some of which are taught in U.S. Pat. Nos. 4,415,230 and 4,395,270. In some PRSM optical fibers such as the "stress rod" type disclosed in U.S. Pat. No. 4,395,270, the core may be circular in cross-section. Diametrically opposed on opposite sides of the core are longitudinally-extending stress rods which have an expansion coefficient different from that of the cladding. Depending on the thermal expansion coefficient of the stress rod glass with respect to that of the cladding glass, the core will exhibit a greater value of refractive index along some axis in the plane orthogonal to the fiber axis. The major axis may be defined as that axis of the orthogonal plane which extends through the core in the direction of maximum refractive index.

Two PRSM fibers could be provided with a coating having a circular cross-sectional shape by employing coaters having circular sizing dies. When a round coating is formed, a precision tractor system should be used to minimize twisting of the coating in the tractors, thus ensuring that the major and minor axes of the PRSM fibers are properly oriented.

To form coated fibers of the type shown in FIGS. 3 and 7, wherein a single fiber is provided with a rectangular coating, preforms 63 and 64 of FIG. 9 are merely replaced by a single preform.

Figure 13:
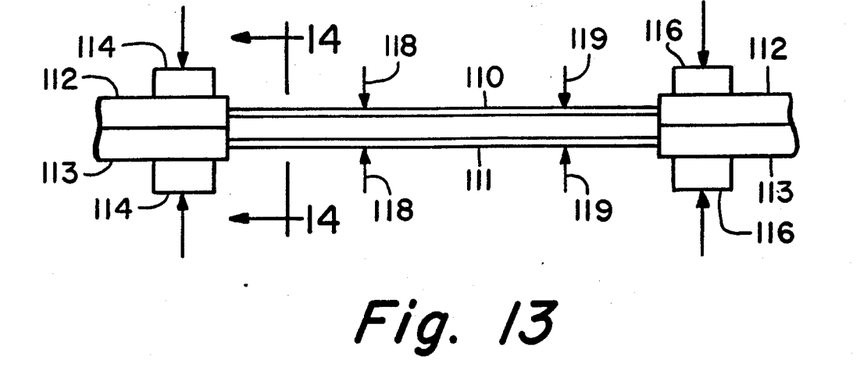
FIG. 13 is a schematic illustration of a fixture for forming a fiber optic coupler having no glass tube.
Figure 14:
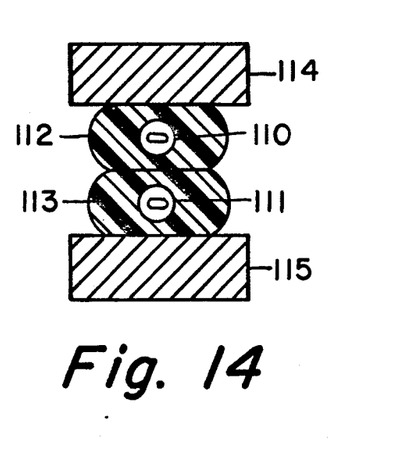
FIG. 14 is an enlarged cross-sectional view taken along lines 14—14 of FIG. 13.
Figure 15:
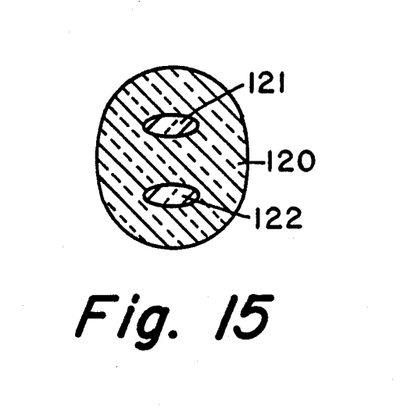
FIG. 15 illustrates a cross-section of a coupler produced in the fixture of FIG. 13.

The fiber orienting technique of the present invention can also be employed in the fabrication of biconically tapered fiber optic couplers of the type disclosed in U.S. Pat. No. 4,755,037, which do not employ a tube. FIG. 13 shows a fixture for clamping coatings 112 and 113 of two PRSM fibers 110 and 111, respectively. As shown in FIG. 14, the major axes of fibers 110 and 111 are parallel when the flat sides of coatings 112 and 113 are adjacent one another. Two spaced regions of the fibers are secured by clamps 114 and 116 in such a manner that there are no twists in the fibers between clamps. The clamps must be spaced a sufficient distance to enable fibers 110 and 111 to be fused together and stretched to form an adequately long coupling region. After the coatings have been removed from those sections of the fibers between the clamps, the fibers are brought together at the two locations indicated by arrows 118 and 119. A length of the contacting fibers is fused together and stretched as taught in U.S. Pat. No. 4,755,037. During the fusion step, the molten fiber cladding flows and forms a common fused cladding 120, thereby allowing cores 120 and 121 to move closer together as shown in FIG. 15.

EXAMPLE 1

To form a glass capillary tube, glass particulate material was applied to a cylindrical mandrel, consolidated, drawn, and dried in accordance with the teachings of U.S. Pat. Nos. Re. 28,029, 3,884,550, 4,125,388 and 4,286,978, all of which are hereby expressly incorporated herein by reference. More specifically, particulate material composed of borosilicate glass containing 8 wt % $B_2O_3$ was deposited on a mandrel to form a porous, cylindrically-shaped preform. The mandrel was removed and the porous preform was consolidated to form a tubular glass body. A rectangular bore was formed in accordance with the teachings of U.S. Pat. No. 4,750,926, which is incorporated herein by reference. The method disclosed in that patent teaches shrinking the tube onto a carbon mandrel of desired cross-section and then burning out the mandrel. The resultant tubular article was redrawn to reduce the cross-sectional dimensions of the bore to about 400 $\mu$m by about 145 $\mu$m. The resultant precision capillary tube was severed into individual tubes each having an outside diameter of about 2.8 mm and a length of 5.1 cm. At the ends of the longitudinal bore were formed tapered apertures 12 and 13, which extended about 2 $\mu$m into the bore.

A preform of the type illustrated in FIG. 12 was placed in a draw furnace. The elliptical core region consisted of $SiO_2$ doped with 30 wt. % $GeO_2$, and the cladding was pure $SiO_2$. A PRSM optical fiber having a diameter of 80 $\mu$m was drawn and coated by an apparatus of the type shown in FIG. 9, the coaters being of the type shown in FIGS. 10 and 11. The draw tractors were the belt-capstan wheel type disclosed in U.S. Pat. No. 4,755,021. A 14 cm length of coated fiber was gripped between a capstan wheel and a 2.5 cm wide rubber belt which was driven by a capstan motor spindle and spaced by two idler rolls. Fiber diameter was measured by an Anritsu fiber measurement system which provided a signal to the tractors to control the speed thereof. The fiber core size was 2 $\mu$m by 5.5 $\mu$m. The first coater had a round sizing die having a diameter of 0.114 mm (0.0045 inch). The second coater had a rectangular sizing die, the dimensions of which were 0.127 mm (0.005 inch) by 0.201 mm (0.0094 inch). The first coater was supplied with DeSoto brand low modulus urethane acrylate primary coating material, and the second coater was supplied with DeSoto brand high modulus urethane acrylate secondary coating material. The coating material was supplied to both coaters at room temperature. Ultra violet light curing means 74 and 78 were located 6 cm from coaters 72 and 76, respectively. Fiber draw rate was 6 m/sec. The resultant cable, which was similar to those shown in FIG. 3, had a maximum thickness of about 190 $\mu$m and a minimum thickness of about 130 $\mu$m. The resultant coated fiber was cut into lengths of approximately 2 m. A commercially available mechanical stripper was used to remove the resin coating from approximately 3.8 cm (1 ½ inches) of the central portions of two lengths of coated fiber.

The uncoated portions of the fibers were wiped with a lintless cloth to remove residual matter, and the fibers were pulled through longitudinal bore 11 of a capillary tube 10 formed as described above. The uncoated portions of the fibers were approximately centered within the bore. A hollow glass fiber 22 having an outside diameter of approximately 125 $\mu$m was inserted approximately 0.3 to 0.6 cm (⅛ to ¼ inch) into tapered aperture 13. A quantity of Norland UV curable glue was disposed within the tapered aperture about the fibers and filament and cured by exposure to UV light for about 1 minute. In this manner the optical fibers and filament 22 were rigidly affixed to the end of tube 10. A second hollow fiber 21 was inserted approximately 0.3 to 0.6 cm (⅛ to ¼ inch) into the other tapered aperture 12. A slight tension was applied to the two fibers and a drop of UV curable glue was applied and cured as described above. The assembly so formed was mounted in a tinner's clamp that was modified by cutting away the central portion and one end portion of the clamping region such that when the coupler assembly was mounted, midregion 28 and one tube end surface was exposed. A tube connected to a vacuum source was connected to one end of the capillary tube such that the optical fibers and hollow filament were disposed inside the evacuated tube. In this manner, bore 11 was evacuated through hollow filament 22. Hollow fiber 21 was inserted into a beaker of 30% ammonia solution. The ammonia solution was sucked into bore 11 whereby the bore and the outside surfaces of the optical fibers were cleansed for approximately 10 seconds. Hollow fiber 21 was then removed from the beaker of cleansing solution. After as much of the liquid as possible was removed from bore 11 by the vacuum source, a burner was directed at tube 10 for about 20 seconds to assist in drying out the interior thereof.

The midregion 28 of tube 10 was then heated to the softening point of the borosilicate glass by an oxygen-hydrogen burner whereupon the glass collapsed around the optical fibers within the longitudinal aperture. The flame was then traversed through the midregion in the direction of the vacuum source so that as the material of the tube collapsed about the optical fibers, residual matter within the bore 11 was sucked out by the vacuum.

The assembly so formed was then removed from the modified tinner's clamp and placed in a Heathway precision glass working lathe having a computer controlled drawn down mechanism. The flame from an oxygen-hydrogen gas burner was then applied to a small portion of the solid midregion until the softening point of the materials was reached, whereupon the computer controlled pull down apparatus stretched the heated section for an interval of approximately 0.5 second. The diameter of the pulled down section was approximately 0.7 mm.

Thereafter, hollow filaments 21 and 22 were broken off, and UV curable glue was applied to the ends of the device to cover the resultant holes. Signal losses measured on the coupler so formed were typically in the 0.05 to 0.7 dB range at 1300 $\mu$m wavelength. This produced a 50:50 signal split in the fibers having a 1200 $\mu$m cutoff wavelength. Couplers having extinction ratios greater than 19 dB have been fabricated.

EXAMPLE 2

An experiment was performed to determine the relative orientation of two PRSM fibers in the collapsed midregion of a capillary tube when the orienting feature is the incorporation of the fibers in a cable of the type shown in FIG. 8. The details of this method are the same as those described in Example 1 unless otherwise stated. Two preforms of the type shown in FIG. 12 were fused to a glass handle which was mounted in the vertically movable support mechanism of the furnace. The major axes of the core regions were parallel to one another. The diameter measuring system was oriented such that the axis of a beam of light from the source was located in the plane in which the longitudinal axes of both fibers were disposed. The light beam was directed across both fibers, and the shadow activated the detector. Fibers 47 and 48, each having the dimensions of the fiber of Example 1, were drawn through the first and second coaters to apply primary and secondary coatings thereto. In this example, the first and second coaters had rectangular sizing dies. The cross-sectional dimensions of the first coater sizing die were 0.23 mm (0.009 inch) by 0.51 mm (0.02 inch), and those of the second coater sizing die were 0.46 mm (0.018 inch) by 1.02 mm (0.04 inch). The resultant flexible cable, which was similar to that shown in cross-section in FIG. 8, had a maximum thickness of 375 μm and a minimum thickness of 325 μm. The cable was severed into 2 meter lengths. A 2 m length of two fiber cable 50 was pulled taut and the ends thereof were taped to a table. A small brush about 3.8 cm wide was dipped into a container of methylene chloride and then placed on the central region of the cable to expose a 3.8 cm long section of the cable to the solvent. After the coating had been exposed to the solvent for about 4 minutes, the cable was wiped with a cloth to remove the softened coating.

A precision capillary tube was formed by drawing down a tubular structure until the circular bore had an inside diameter of 450 μm. The outside diameter was 2.8 mm. Coupler tubes having tapered apertures were severed from the precision capillary tube.

The cable was pulled through a coupler tube bore so that the uncoated portions of the fibers were approximately centered within the bore, and a slight tension was applied to the two fibers. Hollow glass fibers were inserted into the tapered apertures at both ends of the tube and glue was disposed within the apertures and was cured. The assembly so formed was mounted in a tinner's clamp. A tube connected to a vacuum source was affixed to one end of the capillary tube such that the optical fibers and hollow filament were disposed inside the evacuated tube. Those elements within the tube bore were cleaned in 30% ammonia solution and then dried.

The tube midregion was heated to the softening point of the borosilicate glass by an oxygen-hydrogen burner, thereby causing the glass to collapse around the optical fibers within the longitudinal aperture. The flame traversed through the midregion in the direction of the vacuum source.

The assembly so formed was then removed from the modified tinner's clamp and placed in a Heathway precision glass working lathe having a computer controlled drawn down mechanism. The flame from an oxygen-hydrogen gas burner was applied to a small portion of the solid midregion until the softening point of the materials was reached, whereupon the computer controlled pull down apparatus stretched the heated section for an interval of approximately 0.5 second. The diameter of the pulled down section was approximately 0.7 mm. Analysis of the cross-section of the sample revealed that the cores of the fibers were aligned as illustrated in FIG. 5.

We claim:

1. A method of making a fiber coupler comprising the steps of:

disposing in side-by-side relationship at least two sections of polarization retaining optical fiber, each of which possesses an azimuthal inhomogeneity, the azimuthal inhomogeneities of said fibers being oriented with respect to each other, at least a portion of said fibers adjacent said sections having a coating, and heating and stretching at least the midregion of said at least two sections of said fibers to join said fibers in side-by-side fashion and to elongate said fibers, whereby the cores thereof are reduced in diameter and are brought closer together to effect the coupling of optical energy between said fibers, said method being characterized in that during the step of disposing, said fibers are azimuthally oriented with respect to one another by said coating.

2. A method in accordance with claim 1 wherein each said portion of optical fiber has a coating which has an azimuthal inhomogeneity that is oriented with respect to the azimuthal inhomogeneity of the fiber therein, the azimuthal inhomogeneity of each coating being aligned with respect to the azimuthal inhomogeneity of each of the remaining coatings to align the azimuthal inhomogeneities of said fibers.

3. A method in accordance with claim 2 wherein each said portion of optical fiber has a coating which has at least one substantially flat surface; wherein the step of disposing comprises disposing the ends of said fiber portions in the end of the bore of a glass tube, said fiber sections extending through the remainder of said bore, said bore having at least one flat wall surface, each flat surface of a coating being situated adjacent a flat wall surface of said bore, and wherein the step of heating and stretching comprises heating the midregion of said tube to collapse said midregion on said fibers and drawing at least a portion of the midregion of said tube.

4. A method in accordance with claim 3 wherein the flat surfaces of at least two coatings are disposed adjacent to a single flat wall surface of said bore.

5. A method in accordance with claim 1 wherein all of said portions of optical fiber are disposed in a common coating, the azimuthal inhomogeneities of said fibers being properly aligned within said common coating.

6. A method in accordance with claim 1 wherein the step of disposing comprises disposing said fiber sections in the bore of a glass tube, and wherein the step of heating and stretching comprises heating the midregion of said tube to collapse said midregion on said fibers and drawing at least a portion of the midregion of said tube.

7. A method in accordance with claim 6 wherein all of said portions of optical fiber are disposed in a common coating, the azimuthal inhomogeneities of said fibers being properly aligned within said common coating, and wherein the bore of said tube is round.

8. A method in accordance with claim 6 wherein the bore of said tube has opposed flat wall surfaces and wherein all of said portions of optical fiber are disposed in a common coating having opposed flat surfaces, the azimuthal inhomogeneities of said fibers being properly aligned within said common coating, the opposed flat surfaces of said coating being situated adjacent the flat wall surfaces of said bore.

9. A method of making a fiber coupler comprising the steps of:

disposing within the longitudinal bore of a glass tube at least two polarization retaining optical fibers, each of which possesses an azimuthal inhomogeneity, said fibers extending beyond at least one end of said tube, at least those portions of said fibers that extend from said tube having a coating, the azimuthal inhomogeneities of said fibers being oriented with respect to each other, holding said fibers taut to effect a tension therein, heating the midregion of said tube to collapse said midregion around said fibers, and drawing at least a portion of said midregion to reduce the diameter thereof, whereby the cores of said fibers are reduced in diameter and are brought closer together, said method being characterized in that during the step of disposing, said fibers are azimuthally oriented with respect to one another by said coating.

10. A method in accordance with claim 9 wherein each said portion of optical fiber has a coating which has an azimuthal inhomogeneity that is oriented with respect to the azimuthal inhomogeneity of the fiber therein, the azimuthal inhomogeneities of said coatings being aligned to align the azimuthal inhomogeneities of said fibers.

11. A method in accordance with claim 9 wherein each said portion of optical fiber has a coating which has at least one substantially flat surface, and wherein said bore has at least one flat wall surface, each flat surface of a coating being situated adjacent a flat wall surface of said bore.

12. A method in accordance with claim 11 wherein the flat surfaces of at least two coatings are disposed adjacent to a single flat wall surface of said bore.

13. A method in accordance with claim 9 wherein all of said portions of optical fiber are disposed in a common coating, the azimuthal inhomogeneities of said fibers being properly aligned within said common coating.

14. A method in accordance with claim 9 wherein the bore of said tube has opposed flat wall surfaces and wherein all of said portions of optical fiber are disposed in a common coating having opposed flat surfaces, the azimuthal inhomogeneities of said fibers being properly aligned within said common coating, the opposed flat surfaces of said coating being situated adjacent the flat wall surfaces of said bore.

15. A method of making a fiber coupler comprising the steps of:

providing a glass tube having a longitudinal bore, at least one wall surface of which is flat, inserting into said bore at least two polarization retaining optical fibers, each of which possesses an azimuthal inhomogeneity, those portions of said fibers that extend from said tube having a coating having at least one flat surface that is specifically oriented with respect to the azimuthal inhomogeneity of the fiber therein, said coatings extending a short distance into the end of said bore so that a flat surface of each coating lies adjacent a flat wall surface of said bore, whereby orienting the azimuthal inhomogeneities of said fibers with respect to each other, the remainder of the lengths of said fibers within said bore, the lengths of which are slightly shorter than the length of said bore, being free from coating material, holding said fibers taut to effect a tension therein, heating the midregion of said tube to collapse said midregion around said fibers, and drawing at least a portion of said midregion to reduce the diameter thereof, whereby the cores of said fibers are reduced in diameter and are brought closer together.

16. An optical fiber coupler comprising at least two polarization retaining glass optical fibers, each having an azimuthal inhomogeneity, a section of each fiber being free from coating material, the portions of each fiber on either end of said section having coating means for orienting the azimuthal inhomogeneities of said fibers, the midregions of said fiber sections being fused in side-by-side relation to form a fused cladding in which the cores of the fibers are disposed, the midregion of the fused cladding having a central portion, the diameters of the cores of said fibers being smaller in said central portion than in the remainder of said midregion, the cores of said fibers being more closely spaced in said central portion than in the remainder of said midregion.

17. An optical fiber coupler in accordance with claim 16 wherein said coating means is characterized such that each fiber is provided with a coating having opposed, flat surfaces, the flat surfaces of adjacent coatings being congruently disposed.

18. An optical fiber coupler in accordance with claim 16 wherein said coating means is characterized such that all of said fibers are disposed within a common coating and the azimuthal orientations of said fibers are properly aligned in said coating.

19. An optical fiber coupler comprising an elongated glass body having a solid midregion and first and second opposite end portions which respectively extend from said midregion to the first and second ends of said body, the central portion of said midregion having a smaller diameter than the remainder thereof, first and second longitudinal bores respectively extending from said first and second ends of said body to the midregion thereof, at least two polarization retaining glass glass optical fibers extending through said body and beyond the first and second ends thereof, each said fiber having a core and a cladding and having an azimuthal inhomogeneity, the diameters of the cores of said fibers being smaller in said central portion than in the remainder of said midregion, the cores of said fibers being more closely spaced in said central portion than in the remainder of said midregion, and said fiber claddings being fused together in a unitary mass in said central portion, coating means for orienting the azimuthal inhomogeneities of said fibers, said coating means being disposed on those portions of said fibers that extend from said body and on those portions of said fibers extending into the ends of said bores at the first and second ends of said body, those portions of said fibers that are disposed in said midregion having no coating, said coating means being asymmetrical with respect to the axes of said fibers.

20. An optical fiber coupler in accordance with claim 19 further comprising means within said bores for attaching said fibers to the ends of said glass body.

21. An optical fiber coupler in accordance with claim 19 wherein said coating means is characterized such that each fiber is provided with a coating having opposed, flat surfaces, and said longitudinal bores have rectangular cross-sectional shapes.

22. An optical fiber coupler in accordance with claim 21 wherein a flat surface of each coating is disposed adjacent a single flat wall surface of each of said bores.

23. An optical fiber coupler in accordance with claim 19 wherein said coating means is characterized such that all of said fibers are disposed within a common coating and the azimuthal orientations of said fibers are properly aligned in said coating.

24. An optical fiber coupler in accordance with claim 23 wherein said bores have rectangular cross-sectional shapes and wherein said coating has opposed, flat surfaces.

* * * * *